US009338352B2

(12) United States Patent
Strandemar

(10) Patent No.: US 9,338,352 B2
(45) Date of Patent: May 10, 2016

(54) IMAGE STABILIZATION SYSTEMS AND METHODS

(71) Applicant: FLIR Systems AB, Täby (SE)

(72) Inventor: Katrin Strandemar, Rimbo (SE)

(73) Assignee: FLIR Systems AB, Taby (SE)

( * ) Notice: Subject to any disclaimer, the term of this patent is extended or adjusted under 35 U.S.C. 154(b) by 555 days.

(21) Appl. No.: 13/728,856

(22) Filed: Dec. 27, 2012

(65) Prior Publication Data

US 2013/0169819 A1 Jul. 4, 2013

(30) Foreign Application Priority Data

Dec. 30, 2011 (EP) ........................................ 1119624

(51) Int. Cl.
*H04N 5/232* (2006.01)
*H04N 5/33* (2006.01)
(52) U.S. Cl.
CPC ............ *H04N 5/23248* (2013.01); *H04N 5/33* (2013.01)
(58) Field of Classification Search
CPC ....... H04N 5/23248; H04N 5/04; H04N 5/33; H03H 17/04; H03H 17/08; H03H 2017/0472
See application file for complete search history.

(56) References Cited

U.S. PATENT DOCUMENTS

| 5,629,988 | A * | 5/1997 | Burt et al. ....................... 382/276 |
| 7,397,500 | B2 * | 7/2008 | Yost et al. ................. 348/208.99 |
| 2006/0220888 | A1 * | 10/2006 | Germouni et al. ............ 340/605 |
| 2008/0095459 | A1 * | 4/2008 | Vitsnudel et al. ............. 382/260 |
| 2008/0112594 | A1 * | 5/2008 | Williams et al. .............. 382/107 |
| 2009/0116688 | A1 * | 5/2009 | Monacos et al. .............. 382/100 |
| 2009/0122866 | A1 | 5/2009 | Crawford et al. |
| 2009/0257679 | A1 * | 10/2009 | Hogasten ....................... 382/275 |
| 2010/0110209 | A1 * | 5/2010 | Border et al. ............... 348/222.1 |
| 2010/0148066 | A1 | 6/2010 | Stratmann et al. |
| 2010/0149352 | A1 * | 6/2010 | Jang et al. ................ 348/208.11 |
| 2010/0232706 | A1 * | 9/2010 | Forutanpour .................. 382/199 |
| 2011/0019013 | A1 * | 1/2011 | Lin et al. ..................... 348/208.4 |
| 2012/0002842 | A1 * | 1/2012 | Murashita et al. ............ 382/103 |
| 2012/0062754 | A1 * | 3/2012 | Huang ..................... 348/208.99 |

(Continued)

FOREIGN PATENT DOCUMENTS

GB 2 316 255 2/1998

OTHER PUBLICATIONS

Balakirsky S B et al., "Performance Characterization of Image Stabilization Algorithms", Real-Time Imaging 2, vol. 2, No. 5, Oct. 1, 1996, pp. 297-313.
Hua, Yan et al., "Edge Projection-Based Image Registration", School of Information Science and Engineering, Shandong University, China, Aug. 17, 2005, pp. 1231-1237.

(Continued)

*Primary Examiner* — Christopher S Kelley
*Assistant Examiner* — Deirdre Beasley
(74) *Attorney, Agent, or Firm* — Haynes and Boone, LLP

(57) ABSTRACT

A method and systems of stabilizing a sequence of infrared (IR) images captured using an infrared (IR) imaging system, includes: generating edge information representations of selected captured IR images in said sequence; for each generated edge information representation, generating a second representation having a reduced amount of information compared to the edge information representation; determining displacements between captured IR images in relation to previous IR images in said sequence based on a comparison between said second representations; generating a stabilized sequence of IR images by shifting said captured IR images based on said determined displacements.

17 Claims, 7 Drawing Sheets

(56) References Cited

U.S. PATENT DOCUMENTS

| | | | |
|---|---|---|---|
| 2012/0095433 A1* | 4/2012 | Hungerford et al. | 604/500 |
| 2012/0218427 A1* | 8/2012 | Wu | 348/208.6 |
| 2013/0044226 A1* | 2/2013 | Uehara | 348/208.1 |
| 2013/0113939 A1* | 5/2013 | Strandemar | 348/164 |

OTHER PUBLICATIONS

Ziou D et al., "Edge Detection Techniques—An Overview", Pattern Recognizaton, Image Analysis, Allen Press, vol. 8, No. 4, Jan. 1, 1998, pp. 537-542.

\* cited by examiner

IMAGE STABILIZATION SYSTEMS AND METHODS

CROSS-REFERENCE TO RELATED APPLICATIONS

This patent application claims the benefit of and priority to EP Patent Application No. 11196241.1 filed Dec. 30, 2011, which is incorporated herein by reference in its entirety.

TECHNICAL FIELD

Generally, embodiments of the invention relate to the technical field of image stabilization. More specifically, different embodiments of the application relate to stabilizing infrared (IR) images captured using an IR imaging device.

BACKGROUND

When a sequence of image frames depicting a scene is captured, differences between consecutive frames are often introduced, due to movements between the imaging device used to capture the image frame sequence and the scene that is being imaged. Such differences may also be referred to as image jitter and is perceived when displayed as a small image motion. The scene may for example have changed from one frame to the next due to changes in light in the imaged scene or movements of depicted objects. Also, in most cases the imaging sensor will not have been kept perfectly still. If the imaging device is handheld, it is evident that there will be movements caused by the user of the imaging device. If the camera is stationary, for example on a stand, vibrations of the imaging device or the surroundings may cause movements of the imaging sensor.

In order to compensate for such relative movements between the imaging device and the imaged scene, image stabilization methods are commonly used. Image stabilization in the context of this description may also be referred to as motion compensation.

There are many different ways of stabilizing images known in the art. Most of them relate to stabilization of visual light images. However, a good image stabilization algorithm for visual images will not necessarily be a good image stabilization algorithm for infrared (IR) images, because of the different properties of visual light images and IR images.

For instance, visual light images typically have a smaller dynamic range than IR images, since visual images are usually represented using 8 bits of information per pixel (255 colors), while the information in infrared images pixels is usually represented by 16 bits of information, corresponding to approximately 65000 detectable levels of IR radiation. This refers to the underlying information comprised in the IR image representation. Of course, when an IR image is displayed on a display device it will be first have been converted to a visual representation where every pixel comprises 8 bits of information, thereby being enabled to display 256 color levels. For stabilization purposes however, it is desirable to stabilize on the underlying IR data and not on the compressed visual interpretation of the data. This means that image stabilization methods used for visual images will in many cases become much too computationally expensive when the same methods typically used for 8 bit images are applied on 16 bit images.

How an IR image is visually represented and displayed depends on the underlying IR image data, but adjustments may be made to the visual representation before it is presented to a user. For instance, the number of colors, or representation levels, is typically reduced to 255. However, as described above it is the underlying image data that is used for IR image stabilization.

Also, visual light image data is more alike from frame to frame in an image frame sequence, since the shutter of the visual light imaging device is adapted based on the incoming light, compensating for changes in lighting, so that there is a smooth transition from frame to frame as the visual light image frame sequence is displayed to a user. This likeness between image frames is for instance apparent by regarding the histograms for subsequent visual light image frames, wherein the histograms typically correspond well to each other. For IR images on the other hand, the underlying IR image data is based on the entire range of detected IR radiation, corresponding to the temperatures of the objects in the images scene. Therefore, if the temperatures of objects in the scene change rapidly, the IR image data will change accordingly. IR images typically also comprise more noise than visual light images and have a lower signal-to-noise (SNR) ratio, which may complicate image stabilization based on matching between subsequent image frames.

In order to stabilize images with respect to each other, it is common to identify corresponding features or objects in the images and use the position of corresponding features or objects to shift one image with respect to the other in order to achieve proper registration.

In order to reduce the computational effort required for such feature or object recognition and/or identification, it is known in the art to apply a Radon transformation to the images, in their original form, before they are compared and stabilized. Thereby the information in each m×n image is compressed into two vectors of the sizes m×1 and n×1, respectively.

A feature or object recognition method will typically recognize features or objects with large contrast compared to surrounding pixels, rather than features or objects with low contrast compared to the surroundings. For IR images, this means that features or objects with high temperature, or high intensity, are more likely to be recognized than other features or objects in the image. In order words, hot objects are weighted higher than cold objects in the recognition process. In order to reduce this weighting of hot objects, derivatives or gradient-based methods may be used. However, such methods are quite complex and therefore computationally expensive to use for image preprocessing.

Another possible approach towards reducing the weighting of hot objects is to use mean value or median value calculations of the images, and normalize the images based on the calculated values. In order to calculate the mean or median value of an image, the entire image must be stored in a memory and loaded in its entirety, in other words all pixel values must be accessible. For the case of median value calculation all values must further be sorted. Therefore, preprocessing the images by calculation of mean or median values will increase the computational load significantly.

Therefore, there is a need for improved image stabilization that is adapted to the properties of IR images.

SUMMARY

Systems and methods are disclosed, in accordance with one or more embodiments, which are directed to providing good image stabilization for infrared (IR) images. For example for one or more embodiments, systems and methods may achieve image stabilization at low computational cost and/or achieve image stabilization for images with low signal-to-noise (SNR) ratio (e.g., also referred to as low contrast).

According to one or more embodiments of the invention in the form of systems and methods disclosed herein, image stabilization is performed by finding the displacement between IR image frames, using representations of the IR image frames having a reduced amount of information compared to the original IR image frames. Operations to determine displacement between the IR images are applied to the reduced information IR image frames and adjustment of the IR images is performed based on the determined displacement to generate a stabilized sequence if IR images at a low computational cost. According to an embodiment, a feedback control loop is used in order to optimize the threshold values of the image stabilization method and thereby obtain an even better stabilization result.

For example an embodiment of the inventive concept of stabilizing a sequence of infrared (IR) images captured using an infrared (IR) imaging system, includes: generating edge information representations of selected captured IR images in said sequence; based on each generated edge information representation, generating a second representation having a reduced amount of information compared to the edge information representation; determining displacements between captured IR images in relation to previous IR images in said sequence based on a comparison between said second representations of IR images; and generating a stabilized sequence of IR images by shifting said captured IR images based on said determined displacements.

An embodiment of an infrared (IR) imaging system according to the inventive concept includes: an infrared sensor; and a processor adapted to process infrared image data from the infrared sensor depicting a scene. The processor is further adapted to: receive a sequence of infrared (IR) images captured using an infrared (IR) imaging device; generate edge information representations of selected captured IR images in said sequence; based on each generated edge information representation, generate a second representation having a reduced amount of information compared to the edge information representation; determine displacements between captured IR images in relation to previous IR images in said sequence based on a comparison between said second representations of IR images; and generate a stabilized sequence of IR images by shifting said captured IR images based on said determined displacements.

Embodiments of the invention further includes a selection of: a display component adapted to display the stabilized sequence of IR images; a memory component adapted to store image data representing the stabilized sequence of IR images; and an output component adapted to output the stabilized sequence of IR images to a receiving unit. The receiving unit may for example be a memory component, a data communication link or a processing unit.

For example according to embodiments of the invention, 16 bit IR images are reduced by image processing operations to 1 bit binary edge maps that are used for comparison and detection of displacement between the original image frames. According to these embodiments, there is no need to keep all information in the images as long as there is enough edge information left to make a useful comparison to detect displacement. Therefore, no complex pre-processing methods are needed for noise removal and/or image enhancement. In an embodiment simpler pre-filtering is performed on the IR images before identifying the pixels that comprise edge information in order to achieve image stabilization for images with low signal-to-noise (SNR) ratio, also referred to as low contrast images.

In accordance with an embodiment, a method for stabilizing a sequence of IR images includes: for each of a first and a second IR image: identifying pixels comprising edge information; generating an edge map, wherein the pixels identified as comprising edge information are assigned pixel values that differ from the pixel values of the remaining pixels; generating a data collection representing the distribution of the first and/or second pixel values in the edge map; thus resulting in a first data collection representing the distribution of the first and/or second pixel values in the first edge map, and a second data collection representing the distribution of the first and/or second pixel values in the second edge map. Then comparing the first data collection to the second data collection, determining the displacement between said first and second IR images based on the comparison between the first and second data collections, and shifting the second IR image based on the determined displacement. Thereby stabilization of the second image to the first image is achieved.

Other embodiments of the claimed invention relate to computer-readable mediums, and computer program products on which are stored non-transitory information for performing stabilization of a sequence of infrared (IR) images.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

One or more embodiments of the present invention will be further explained based on various embodiments described herein and with reference to the accompanying detailed description, claims, and drawings, in which:

Embodiments of the invention and their advantages are best understood by referring to the detailed description that follows. It should be appreciated that like reference numerals are used to identify like elements illustrated in one or more of the figures.

DETAILED DESCRIPTION

Introduction

Below, embodiments of methods, imaging systems and computer-readable mediums for stabilizing infrared (IR) images, captured using an IR imaging device, are presented.

Figure 1:
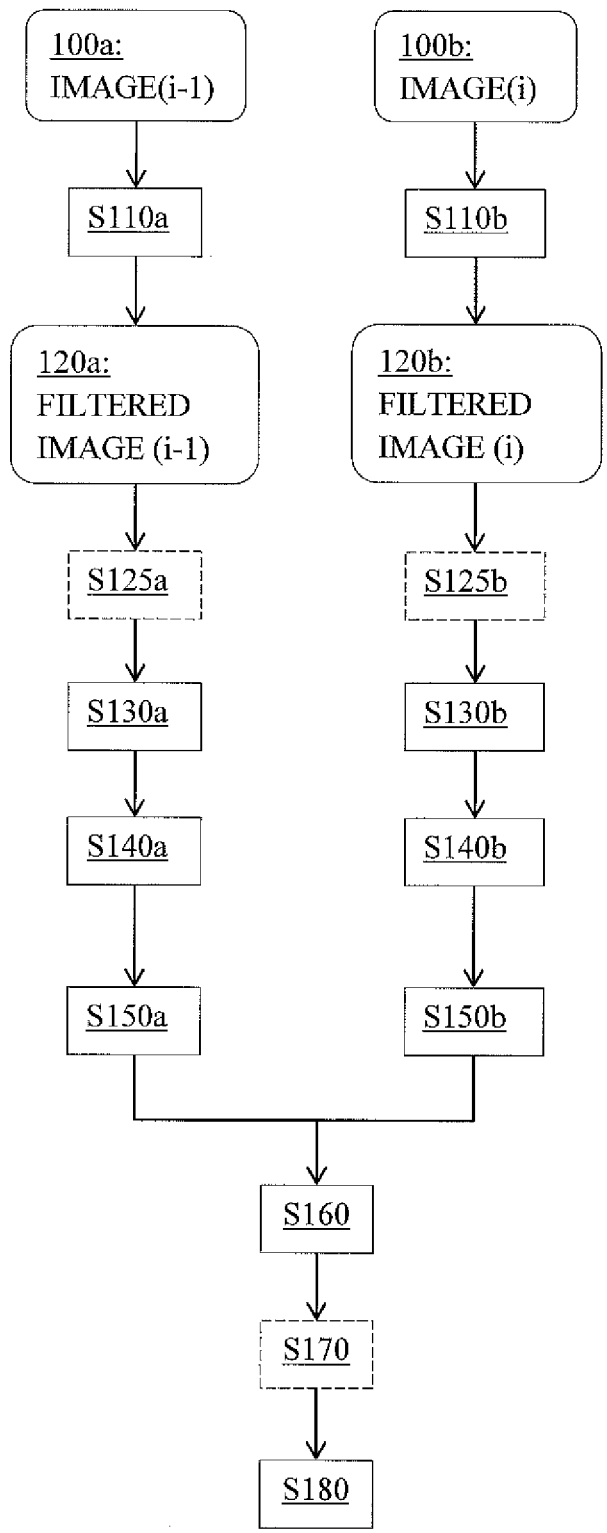
FIG. 1 is a flowchart of methods for stabilizing IR images captured using an IR imaging device, in accordance with embodiments of the invention.
Figure 2:
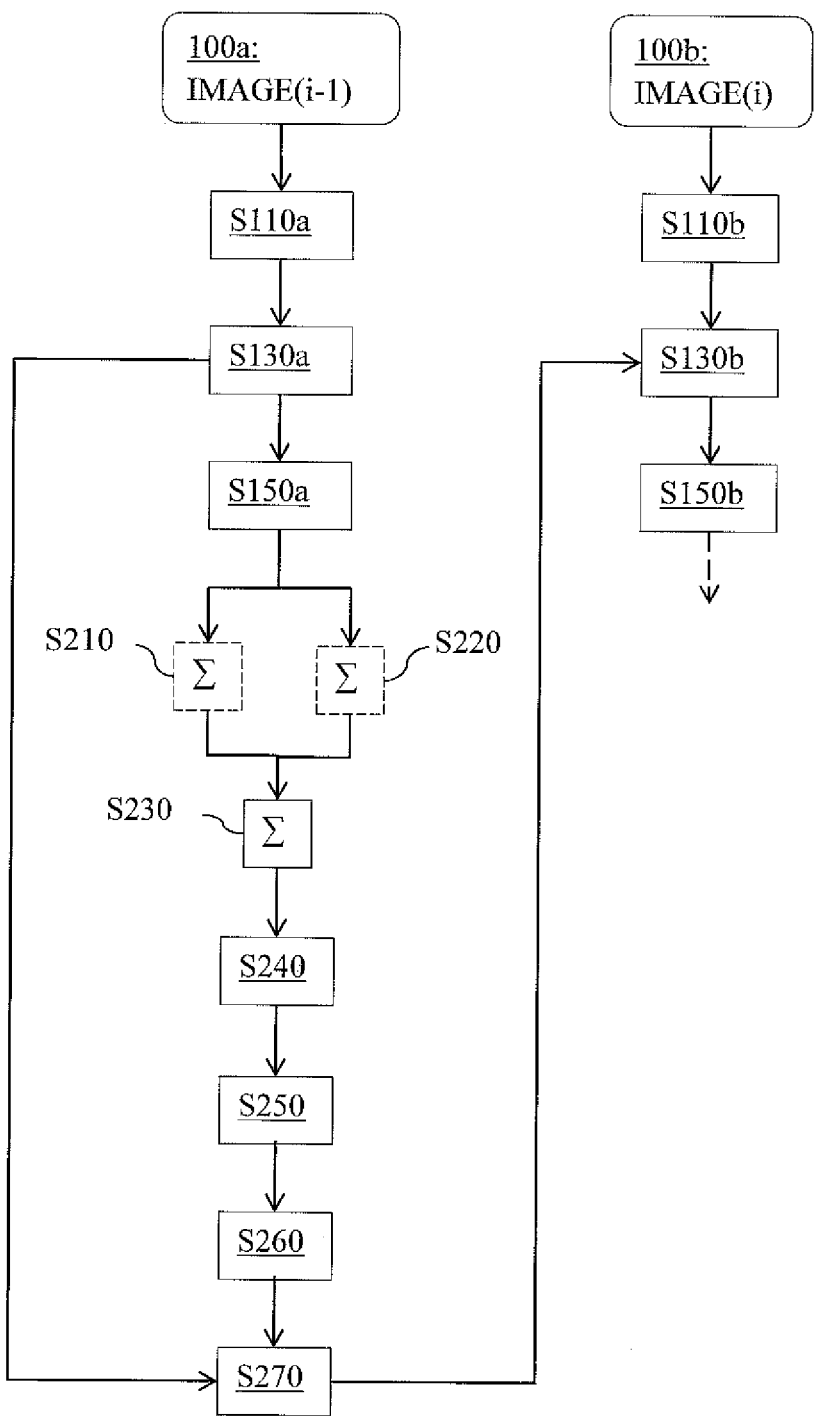
FIG. 2 is a flowchart of a feedback control method, in accordance with an embodiment of the invention.
Figure 3:
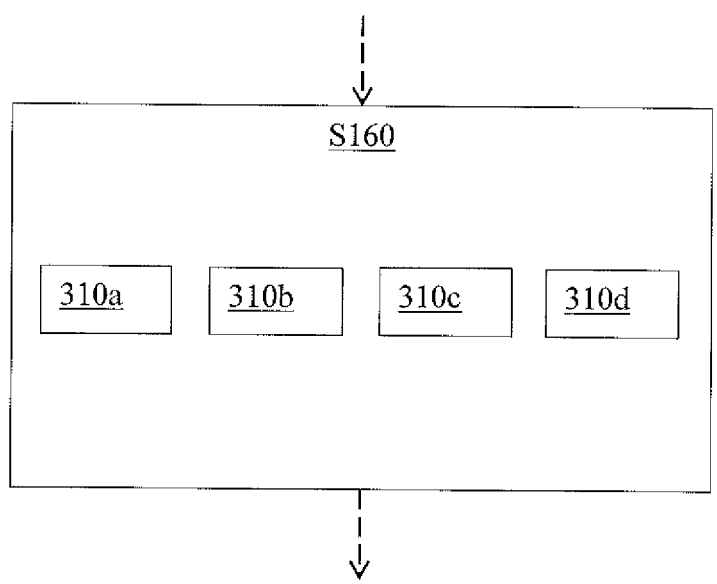
FIG. 3 is a more detailed view of step S160, in accordance with an embodiment of the invention.

FIGS. 1 to 3 show different embodiments of image stabilization methods, including pre-filtering operations, thresholding operations, comparison of obtained data and shift of the pixels of one image frame in relation to the pixels of a second image frame, in order to obtain stabilization between the two image frames. For a sequence of images frames, the image stabilization steps may be performed for every pair of consecutive frames, thereby achieving a smooth transition and an impression of stability between the frames in the image frame sequence upon display. Image stabilization in this context may also be referred to as correction of displacement between images, or difference compensation.

Since no exhaustive search feature detection, object recognition, mean value calculation, median value calculation or other computationally expensive operation that requires that one or more of the image frames in an image frame sequence are stored in a memory and loaded in their entirety is performed, image stabilization according to the embodiments of the invention is achieved at a low computational cost.

According to embodiments of the invention, image stabilization is performed by finding the displacement between image frames, using representation of the image frames having a reduced amount of information compared to the original image frames. According to an embodiment, 16 bit IR images are, by image processing operations described below, reduced to 1 bit binary edge maps that are used for comparison and detection of displacement between the original image frames. According to these embodiments, there is no need to keep all information in the images as long as there is enough edge information left to make a useful comparison between the first edge map, or first edge image, representing the edge information detected in the first IR image; and the second edge map, or second edge image, representing the edge information detected in the second IR image. Therefore, no complex pre-processing methods are needed for noise removal and/or image enhancement, and the method therefore is computationally inexpensive.

According to another embodiment, edge maps of the size m×n are further compressed into 1-dimensional vectors with m×1 entries and n×1 entries, respectively. A comparison between two such vectors is considerably less computationally expensive than a comparison between two m×n edge maps.

According to an embodiment, a feedback control loop is used in order to optimize the threshold values of the image stabilization method and thereby obtain an even better stabilization result.

The different method embodiments are described in more detail below.

Capturing of IR Images

According to an embodiment, an IR image(i) is captured at a time instance i, using an IR imaging device. Alternatively, the IR image(i) has been previously captured at a time instance i using an IR imaging device, stored in a storage comprised in or communicatively coupled to the IR imaging device and retrieved by the processing component that is to perform the image stabilization. Alternatively, the IR image (i) has been captured at a time instance i using an IR imaging device and is transferred to the processing component that is to perform the image stabilization. In FIG. 1 this IR image is referred to as 100b.

At a previous time instance an IR image(i−1) was captured. This image, referred to in the figure as 100a, may for instance have been stored in, and retrieved from, a storage in the IR imaging device, communicatively coupled to the imaging device or communicatively coupled to a processing component adapted to perform the method steps according to embodiments of the invention.

All steps labeled "a" in FIG. 1 are performed on image(i−1) 100a. Corresponding, all steps labeled "b", are performed on image(i) mob. In the description below, the steps labeled "b", relating to image(i) are described. The operation of any step "a", however, corresponds to the corresponding step "b" and is consequently described within the context of the corresponding step "b".

IR image(i) mob is the current image frame, captured at the current time instance i. Therefore, according to an embodiment, the method steps performed on image(i−1) 100a may have been performed at a previous time instance. Alternatively, the steps labeled "a" and the steps labeled "b" may be performed simultaneously.

Edge Detection—Pre Filtering

Step S110a and S110b of FIG. 1 relate to embodiments of pre-filtering of the IR images(i) and (i−1), respectively. According to an embodiment, the image pixels of the original image(i) and image(i−1) each comprises 16 bits of information.

In the following, step S110b is described. In step S110b, the captured IR image(i) 100b is filtered.

According to an embodiment, the IR image(i−1) is high pass filtered. Through the high pass filtering process all information that is not high frequency information is removed. In other words, the high frequency content in the IR image(i−1) is extracted. The extracted high frequency information typically comprises edge information, contour information and/ or high frequency noise.

According to an embodiment, a low pass filter is applied in order to remove noise from the image. The low pass filter kernel is adapted such that the assignment of a pixel value as comprising high frequency information will depend on the values of the neighboring pixels' values, with different weighting applied to different parts of the kernel according to circumstances. In other words, if the investigated pixel has a high pixel value, but not enough of the surrounding pixels, comprised within the kernel, have high values, the pixel is considered as noise and its value will be is reduced, or "smoothed" with relation to the surrounding pixels, as it is set to the average of the sum of the weighted pixel values of the image pixels filtered using the low pass kernel. However, if the investigated pixel has a high value and a significant amount of the surrounding kernel pixels have correspondingly high pixel values, the pixel will be assigned a high value indicating that it does in fact comprise high frequency content in the form of edge or contour information, as it is set to the average of the sum of the weighted pixel values of the image pixels filtered using the low pass kernel. The size of the filter kernels may for instance be 3×3 pixels, 5×5 pixels, 7×7 pixels, 9×9 pixels, 10×10 pixels or any other suitable size. Details relating to design and application of high pass and/or low pass filters and filter kernels are well known within the art of image processing.

The noise present in IR images is typically approximately white noise, meaning that it is quite evenly distributed and does not comprise any large collections of correlated pixels. Therefore, by applying a low pass filter with a kernel adapted to detect correlated objects where many pixels are connected, the typical IR image noise is removed in the edge detection pre-filtering step S110. Hence the image stabilization method according to embodiments described herein achieves improved edge detection and thereby good image stabilization for IR images with low signal-to-noise (SNR ratio), also referred to as low contrast.

After the filtering step S110b, a filtered image(i) 120b is obtained. Correspondingly, a filtered image(i−1) 120a is obtained by filtering of the image(i−1) 100a in step S110a, in accordance with any of the embodiments relating to step S110b.

According to an embodiment, in an optional step S125b, each pixel of the filtered image(i) is assigned the absolute value of its pixel value, in order to obtain a filtered image(i) comprising only positive pixel values. Calculation and assignment of absolute values may alternatively be performed after the low pass filtering, but before the high pass filtering operation. According to an alternative embodiment, the pixel values of the filtered image(i) are left unchanged. Correspondingly, any of the alternative embodiments may be applied to the filtered image (i−1), in an optional step S125a.

Edge Detection—Edge Map Generation

In step S130b, edge information in the filtered image(i) is detected by applying a threshold parameter $\alpha(i)$, also referred to as a threshold value $\alpha(i)$, to the filtered image (i).

According to an embodiment, the threshold parameter $\alpha(i)$ represents a cutoff value, or threshold value, that separates pixels that are to be selected as comprising edge information from the remaining pixels. Thereby, by applying the threshold parameter $\alpha(i)$, a certain amount of the pixels in the filtered image(i), i.e. the pixels having values equal to or higher than the specified threshold parameter $\alpha(i)$, are identified as comprising edge information, or in other words are detected as edge representing pixels.

According to an embodiment, step S130b further comprises calculating the absolute value for each pixel value of the first and second IR images, and assigning the calculated absolute pixel values to the pixels of the first and second IR images. Thereafter a threshold value $\alpha(i)$ is applied to the filtered image(i).

According to an alternative embodiment, the pixel values of the filtered image(i) are unchanged when the threshold value $\alpha(i)$ is applied to the filtered image(i). According to this embodiment, the pixel values of the pixels in the image comprise positive values and/or negative values.

According to an embodiment, in order to detect edge representing pixels a single positive threshold value $\alpha(i)$ may be applied to the filtered image(i), selecting the pixels that have the highest positive pixel values in the image as representing edge information. Alternatively, a single negative threshold value $\alpha(i)$ may be applied to the filtered image(i), selecting the pixels that have the lowest negative pixel values in the image as representing edge information. Alternatively, a double threshold value$+/-\alpha(i)$ may be applied, selecting the pixels that have the highest positive pixel values in the image and the lowest negative pixel values in the image as representing edge information. Alternatively, a double threshold value may be applied, wherein the positive and negative threshold values do not have the same absolute magnitude, thereby selecting the pixels that have positive pixel values equal to or above a certain positive threshold value and the pixels that have negative pixel values below or equal to a negative threshold value, not having the same magnitude as the positive threshold value, as representing edge information. By way of example only, the positive threshold according to this embodiment may be +3 and the negative threshold may be −2, but any suitable threshold values, represented as integers, decimals or fractions, are applicable, dependent on circumstances.

According to an embodiment, the threshold parameter $\alpha(i)$, or threshold value $\alpha(i)$, is preset.

According to another embodiment, double threshold parameters, or threshold values, are preset.

According to an embodiment, the one or more threshold parameters $\alpha(i)$, or threshold values $\alpha(i)$ are determined and set during production or calibration of the IR imaging device.

Correspondingly, any of the alternative thresholding embodiments may be applied to the filtered image(i−1) in step S130a, using a threshold parameter $\alpha(i-1)$, thereby obtaining edge detection in the filtered image(i−1).

In step S140b, an edge map(i), or edge image(i), is generated, wherein the pixels that have been identified as representing edge information, i.e. comprising the detected edge information, are assigned pixel values that differ from the pixel values of the remaining pixels. Alternatively, the remaining pixels are assigned pixel values that differ from the pixel values of the pixels that have been identified as representing edge information, i.e. comprising the detected edge information.

According to an embodiment, the resulting edge map is a binary image wherein pixels representing detected edge information are assigned the pixel value 1 and the remaining pixels are assigned the pixel value 0, or wherein pixels representing detected edge information are assigned the pixel value 0 and the remaining pixels are assigned the pixel value 1. According to this embodiment, each pixel in the edge map(i) comprises 1 bit of information.

Correspondingly, any of the alternative embodiments for generation of an edge map may be applied to the filtered image(i−1) in step S140a, thereby rendering an edge map(i−1).

Generation of Data Collection

In step S150b a data collection is generated, representing the distribution of the first and/or second pixel values in the edge map(i), or edge image(i). The data collection comprises a reduced amount of information compared to the edge map (i).

By performing steps 110-130 (a and b) according to embodiments presented above, the amount of data by which each pixel is represented is reduced, or compressed, from 16 bits in the original images to 1 bit in the obtained binary edge maps. Thereby, the generation of data collections in step S150 (a and b) also requires very low computational power compared to generating corresponding data collections based on the original images.

After the data collection has been generated, the information comprised in the data collection is stored in a memory comprised in or communicatively coupled to the IR imaging device and used in the following steps of FIG. 1. By storing and processing the information comprised in the data collection instead of the information comprised in the edge map(i) from which the data collection is generated, the computational effort required to perform the method is reduced.

According to an embodiment, a data collection in the form of one or more vectors is generated by applying a Radon transform to the edge map(i). Other suitable transforms may also be used.

The Radon Transform computes the projection sum of the image intensity along a radial line oriented at a specific angle. For each specific angle, the radon transform produce a vector R containing the projection sum of the image intensity at the specified angle.

According to an embodiment, the data collection comprises the distribution of the first and/or second pixel values in the edge map(i) along the x-axis of the edge map(i) and a y-axis of the edge map(i), respectively. According to a further embodiment, the distribution of the first and/or second pixel values in the edge map(i) along the x-axis of the edge map(i) and a y-axis of the edge map(i), respectively are generated by applying a Radon transform to the edge map(i) with the x-axis and the y-axis directions selected as the specified angles for the transform. Thereby, instead of storing and processing a two-dimensional bitmap image in the form of an edge map(i) of the size (length×height) in the following method step, two vectors of the size (1×length) and (1×height), respectively, are stored and processed.

According to an embodiment, the data collection comprises at least two vectors. According to an embodiment, the edge map(i) has a size of m×n pixels and the data collection comprises two vectors:

an x-direction vector having in positions, comprising, for each position ($x_m$), a value representing the number of pixels in the image with x-coordinate ($x_m$) having the first pixel value; and a y-direction vector having n positions, comprising, for each position ($y_n$), a value representing the number of pixels in the image with y-coordinate ($y_n$) having the first pixel value.

According to an embodiment, the edge map(i) has a size of m×n pixels and the data collection comprises two vectors:

an x-direction vector having m positions, comprising, for each position ($x_m$), a value representing the number of pixels in the image with x-coordinate ($x_m$) having the second pixel value; and a y-direction vector having n positions, comprising, for each position ($y_n$), a value representing the number of pixels in the image with y-coordinate ($y_n$) having the second pixel value.

Correspondingly, any of the alternative embodiments for generation of a data collection may be applied to the edge map(i−1) in step S150a, thereby rendering a second data collection representing the distribution of the first and/or second pixel values in the edge map(i−1).

Comparison

According to an embodiment, the first data collection, representing the distribution of the first and/or second pixel values in the edge map(i), and the second data collection, representing the distribution of the first and/or second pixel values in the edge map(i−1), are compared in step S160. Based on the comparison, a difference between the first and second data collections, corresponding to a difference between the edge map(i) and the edge map(i−1), is determined.

As is readily apparent to a person skilled in the art, the difference between the edge map(i) and the edge map(i−1) is a representation of the difference between the IR image(i) and the IR image(i−1), on which the edge maps (i) and (i−1) are based. Therefore, the output of step S160 is a representation of the difference between the IR images (i−1).

According to an embodiment presented above, the data collection for the edge map(i), generated in step S150b, comprises two vectors: one row vector comprising the sums of the pixel values of each column in the edge map(i), and one column vector comprising the sums of the pixel values of each row in the edge map(i). Furthermore, according to an embodiment presented above, the data collection for the edge map (i−1), generated in step S150a, comprises two corresponding vectors. In this case, the comparison of step S160 is a comparison between two vectors comprising integer values. In other words, instead of matching two m×n images with 16 bit pixel values, two vectors m and n entries, respectively, comprising integer values are matched. This gives large savings in computational effort for the comparison.

According to embodiments, the comparing the first data collection to the second data collection in step S160 in order to find the difference between the data collections of edge map(i) and edge map(i−1) comprises at least two comparisons, wherein, for each subsequent comparison, the second data collection is shifted in relation to the first data collection or the first data collection is shifted in relation to the second data collection. An example wherein the step S160 comprises four comparisons 310a to 310d is shown in FIG. 3. The number of comparisons shown in FIG. 3 is a suitably small number for illustration, but, as is readily understandable to a person skilled in the art, any number of comparisons may be performed, depending for instance on the sizes of the IR images, the one or more threshold values used in step S130 (a and b), the displacement determined for the previous frame, the shifting performed on the previous frame and/or the sensitivity of the IR imaging device.

Figure 6:
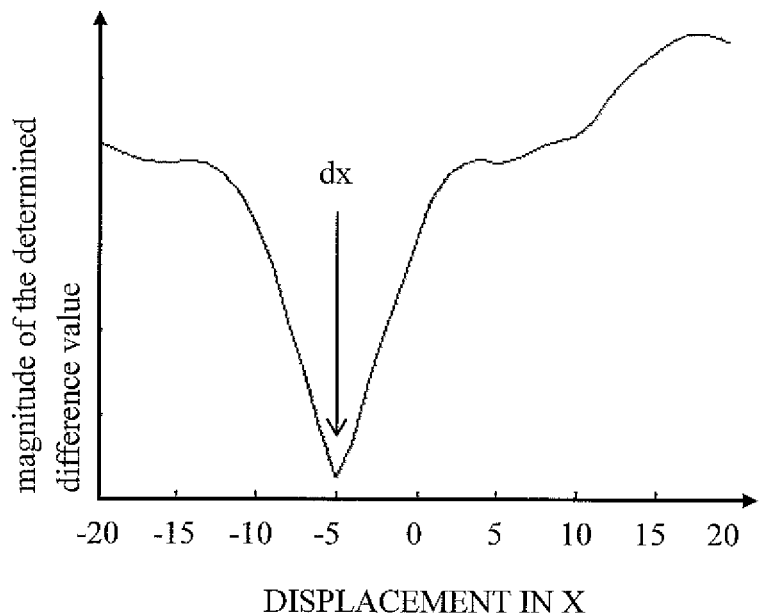
FIG. 6 is a graph showing examples of vector displacement in X and Y, in accordance with one or more embodiments of the invention.
Figure 6:
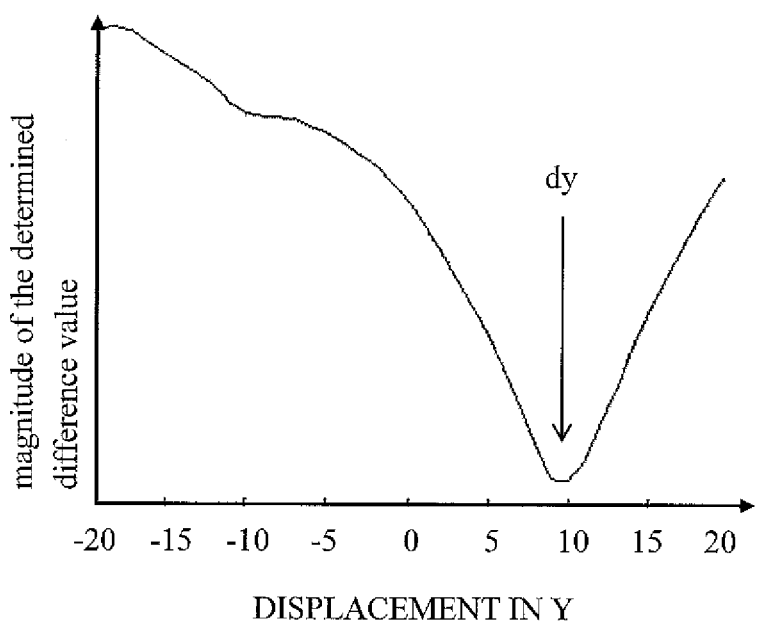

According to an embodiment, information about the displacement determined for one or more previous frames or the shifting performed on one or more previous image frames is used to predict displacement for the current and subsequent image frames. In other words, motion prediction may be performed based on knowledge on previous motion. Further information that may be used to predict motion is preknowledge on the dynamic system, in other words the IR imaging system and a user using the IR imaging system, wherein the system is handheld. Factors that may affect the motion, shift or displacement between image frames in the dynamic system is for example how the IR imaging system moves, vibrations of the IR imaging system and movements of the user holding the IR imaging system, from frame to frame. According to an embodiment, the result of such a motion prediction may be used to select the point in the edge map(i) or the data collection based on the edge map(i) around which the one or more comparisons of step S160 are to be performed. Shifting of data collections and comparisons do not necessarily have to be centered around the middle pixel of the edge map(i) or the middle entry of a vector. Based on the motion prediction, another pixel of the edge map(i) or entries of the corresponding vectors may be predicted to be more likely to represent the best match compared to the edge map(i−1) or corresponding vectors, and therefore the shifts and comparisons may instead be centered around this pixel or entry. According to an embodiment, step S160 includes several comparisons between the data collections of the edge maps(i) and (i−1), wherein the data collections are shifted one position in a predetermined direction for every new comparison. This may be performed in a preset number of iterations. For example, according to the embodiments wherein the data collections comprise one or more vectors, each vector of the edge map(i) is compared to the corresponding vector of the edge map(i−1). The vectors may be compared in a preset number of positions, for example shifting 5, 10, 20 or any other suitable number of pixels, or entries, from the position wherein the entry $x_m$ in the vector of the edge map(i) is compared to the entry $x_m$ of the edge map(i−1) in the comparison starting point. An example of several comparisons wherein the compared vectors, or other data collections, are shifted from the starting point o is shown in FIG. 6.

According to an embodiment, the data vectors are up-sampled to achieve subpixel resolution. For instance, the data vectors are up-sampled by a factor of two. This enables a more accurate comparison between the vectors, wherein a match may be found on a subpixel basis.

Optionally, the step S150b of generating a data collection is preceded by one or more two dimensional comparisons of the edge map(i) and the edge map(i−1), wherein the edge map(i)

and the edge map(i−1) may be in their original form, or wherein one or both of the edge maps may be rotated by a certain degree. Any appropriate number of comparisons, with the edge map(i) and the edge map (i−1), respectively, rotated by selected angles, may be performed. This enables matching of the edge maps rotated by different angles. Of course, this comparison will add to the computational effort required to perform the method.

Stabilization

According to an embodiment, step S170 comprises determining the displacement between the compared first and second data collections, or in other words between the edge map(i) and the edge map(i−1), based on the comparison. According to an embodiment, the displacement is determined as the identified difference between the compared data collections. The displacement between the edge map(i) and the edge map(i−1) corresponds to the displacement, or estimated motion, between the IR image(i) and the IR image(i−1), on which the edge maps (i) and (i−1) are based. Therefore, the output of step S170 represents the displacement between the IR image(i) and the RI image(i−1).

According to an embodiment, wherein at least two comparisons have been performed in step S160, determining the displacement between the compared data collections comprises finding the minimum difference is determined from the differences obtained by the one or more comparisons.

According to an embodiment, one or more comparison between rotated edge maps has been performed, and a minimum difference is determined from the differences obtained by the one or more comparisons.

According to an embodiment, the one or more differences from the one or more comparisons may comprise negative values, and therefore the absolute values of the difference values are calculated before the minimum difference, or displacement, is determined.

According to an embodiment, the minimum difference among all the differences found by comparing the data collection pairs, obtained by shifting the data collections, is determined.

According to an embodiment, the data collections are iteratively compared by shifting the data collections with respect to each other in the x-direction and y-direction, respectively. Thereby, the difference determination results in a number of difference values in the x-direction and a number of difference values in the y-direction, respectively. From the difference values, a minimum difference pair (dx,dy) may be determined, wherein the minimum difference is a pair of values (dx,dy) representing the minimum difference in the x-direction and the y-direction, respectively. The minimum difference pair (dx,dy) may be determined using any suitable method, per se known in the art, for example using difference image techniques or calculation of cross correlation.

According to an embodiment, the difference values are weighted using a likelihood function, based on motion prediction, representing the likelihood that a difference value represents the actual displacement between the compared data collections, edge maps or image frames. Thereafter, the minimum difference from the differences obtained by the one or more comparisons is determined. Thereby, the minimum difference may after the weighting be a different value than before the weighting, more likely to represent the actual displacement.

According to the embodiment wherein the data collections are in the form one or more vectors, for instance generated by applying a Radon transform to the edge maps (i) and determining the minimum difference pair (dx,dy) using for example difference image techniques or cross correlation calculations is very computationally inexpensive, particularly compared to performing the same operations on original IR images having 16 bit pixel values.

As disclosed above and as shown in FIG. 6, an example of difference measures obtained by comparison of data collections in several iterations of the method, wherein the data collections have been shifted with respect to each other for every new iteration. In FIG. 6, the values on the x-axes of the graphs represent the displacement in the x-direction and y-direction, respectively, while the y-axes of the graphs are the magnitude of the determined difference value for each comparison. The magnitude of the determined difference value may for example be expressed in discrete displacement units. The exemplary difference measures in FIG. 6 are the result of an embodiment wherein data collections in the form of an x-vector and y-vector for an edge map(i) and an edge map(i−1), respectively, have been compared. The minimum difference values (dx,dy) are pointed out by arrows in FIG. 6.

According to embodiments presented above, wherein at least two comparisons have been performed in step S160, the displacement between the compared data collections is determined as the minimum difference among at least two difference values, derived from the at least two comparisons. According to embodiments, the minimum difference is determined as a pair of values (dx,dy), representing the minimum difference in the x-direction and y-direction, respectively.

Step S180 comprises shifting the IR image(i) in relation to the IR image(i−1) based on the determined displacement, thereby achieving stabilization of the second image to the first image.

Feedback Control

According to embodiments, a feedback control loop is added to the image stabilization method in order to further improve its performance. The feedback control loop according to the embodiment described below makes the method, or algorithm, robust when it comes to using imaging devices with different noise characteristics and when imaging scenes comprising different scene content.

It may be hard to set a relevant threshold value for generation of an edge map based on an IR image without knowing anything about the scene that is being imaged. The reason is that detected hot objects near detected cold objects in an IR image will render large differences in temperature, or intensity, in the IR image, while objects having more similar temperatures will render small differences in temperature, or intensity, in the IR image. For example, an IR image depicting a human who is outdoors against the background of the sky will have large intensity differences between areas representing the human body and the areas representing the sky, while an IR image depicting a human who is indoors and standing in front of for instance a bookshelf might have very small intensity differences between the human body and the bookshelf. Therefore, selection of a threshold value that is suitable for both types of images, and other images having yet other types of intensity distribution, is not possible. According to embodiments, the feedback control loop controls and adjusts one or more threshold parameters $\alpha(i)$, or threshold values $\alpha(i)$ in order to obtain an optimized number of, or an optimized amount of, pixels in the IR image(i) that are to be identified as comprising edge information, based on information from processing of the previous IR image frame.

According to embodiments of the feedback control loop, the one or more threshold parameters $\alpha(i)$, or threshold values $\alpha(i)$, are controlled such that the percentage of pixels in the IR image(i) that are identified as comprising edge information approaches a preset desired percentage value $\beta$. According to an embodiment, the one or more threshold parameters $\alpha(i)$, or threshold values α(i), are controlled based on the one or more threshold parameters α(i−1) applied on the previous IR image (i−1) and the percentage of pixels identified as comprising edge information in the previous IR image(i−1).

According to an embodiment, the desired percentage value β lies in the following interval:

$$0.05 \leq \beta \leq 0.75, \text{ or in another notation: } 5\% \leq \beta \leq 75\% \quad \text{(Eq. 1)}$$

According to an embodiment, the desired percentage value β lies in the following interval:

$$0.05 \leq \beta \leq 0.35, \text{ or in another notation: } 5\% \leq \beta \leq 35\% \quad \text{(Eq. 2)}$$

According to an embodiment, the desired percentage value β is set to 0.1 (10%). According to another embodiment, the desired percentage value β is set to 0.2 (20%).

Embodiments of Feedback Control

FIG. 2 shows a flowchart of a feedback control method, in accordance with embodiments of the invention. The numerical references 100a, 100b, 110a, 110b, 130a, 130b, 150a and 150b correspond to the same numerical references in FIG. 1, and are explained above.

As described above, the output of step S150a is the data collection representing the distribution of the first and/or second pixel values in the edge map(i−1) or edge image(i−1).

According to an embodiment presented above, the data collection comprises two vectors:
one vector comprising the sums of the pixel values of each column in the edge map(i−1) or edge image(i−1), the vector having m positions comprising, for each vector entry or position ($x_m$), a value representing the number of pixels in the image with x-coordinate ($x_m$) having the first pixel value; and
one vector comprising the sums of the pixel values of each row in the edge map(i−1) or edge image(i−1), the vector having n positions comprising, for each position ($y_n$), a value representing the number of pixels in the image with y-coordinate ($y_n$) having the first pixel value.

According to an alternative embodiment presented above, the data collection comprises two vectors:
one vector comprising the sums of the pixel values of each column in the edge map(i−1) or edge image(i−1), the vector having m positions comprising, for each vector entry or position ($x_m$), a value representing the number of pixels in the image with x-coordinate ($x_m$) having the second pixel value; and
one vector comprising the sums of the pixel values of each row in the edge map(i−1) or edge image(i−1), the vector having n positions comprising, for each position ($y_n$), a value representing the number of pixels in the image with y-coordinate ($y_n$) having the second pixel value.

The vectors may for instance be Radon sum vectors, obtained by applying a Radon transformation to the edge map(i−1) or edge image(i−1).

For the embodiments wherein the data collection comprises two vectors, being summations of the values in the rows and columns of the edge map(i−1) or edge image(i−1), respectively, the optional step S210 and the optional step S220 are performed.

In the optional step S210, the values of all entries in the vector comprising the sums of the pixel values of each column in the edge map(i−1) or edge image(i−1) are summed. Thereby, a resulting single entry vector, or a single value, comprising the sum of all values in the vector comprising the sums of the pixel values of each column in the edge map(i−1) or edge image(i−1) is obtained.

In the optional step S220, the values of all entries in the vector comprising the sums of the pixel values of each row in the edge map(i−1) or edge image(i−1) are summed. Thereby, a resulting single entry vector, or a single value, comprising the sum of all values in the vector comprising the sums of the pixel values of each row in the edge map(i−1) or edge image(i−1) is obtained.

In step S230, all values of the data collection output from step S150a are summed. Thereby, a resulting single entry vector, or a single value, comprising the sum of all values in the data collection is obtained.

If the optional step S210 and step S220 have been performed, the output of step S210 and step S220 are summed in step S230. Thereby, a new single entry vector, or a single value, comprising the sum of all values in the data collection is obtained. Since the vectors output from step S210 and S220 comprise sums of either all pixels having the first pixel value in the edge map(i−1) or edge image(i−1) or all pixels having the second pixel value in the edge map(i−1) or edge image(i−1) in the x-direction and y-direction, respectively, the value output from step S230 is the sum of either all pixels having the first pixel value in the edge map(i−1) or edge image(i−1) or all pixels having the second pixel value in the edge map(i−1) or edge image(i−1).

The output of step S230, according to any of the described embodiments, is hence a single value that may be described as the value of a 1×1 vector, or a 1×1 matrix.

If the optional step S210 and step S220 have been performed, the value output from step S230 is the sum of either all pixels having the first pixel value in the edge map(i−1) or edge image(i−1) or all pixels having the second pixel value in the edge map(i−1) or edge image(i−1).

As is readily apparent to a person skilled in the art, if the data collection comprises more than two vectors, more than two summations according to the optional steps 210 and 220 may be performed in order to arrive at a single vector comprising the summed up values of the data collection after step S230. Correspondingly, if the data collection has any other structure, the values of the data collection may in step S230 be added according to any suitable way known in the art, in order to arrive at a single vector comprising the summed up values of the data collection.

In step S240, a percentage of pixels selected as comprising edge information in edge map(i−1) or edge image(i−1) is calculated from the value obtained from step S230.

In order to calculate the percentage of pixels selected as comprising edge information in edge map(i−1) or edge image (i−1), the number of pixels selected as comprising edge information in edge map(i−1) or edge image(i−1) must first be known.

According to an embodiment, wherein the data collection consists of two vectors comprising the sums of the edge map(i−1) or edge image(i−1) pixel values in the columns and rows, respectively, all pixels having pixel values 1 in the edge map(i−1) or edge image(i−1) will be counted twice as the vectors are summed in step S230. Therefore, according to this embodiment, the value output from step S230 is divided by two in order to obtain the number of pixels having pixel values 1 in the edge map(i−1) or edge image(i−1).

According to an embodiment, the pixels identified as comprising edge information were set to 0 in the edge map(i−1) or edge image(i−1). Thereby, the value output from step S230 must be subtracted from the total number of pixels (m×n) in the edge map(i−1) or edge image(i−1) in order to obtain the number of pixels selected as comprising edge information in edge map(i−1) or edge image(i−1). Thereafter, in step S240, the number of pixels selected as comprising edge information in edge map(i−1) or edge image(i−1) is divided by the number of pixels (m×n) in the edge map(i−1) or edge image(i−1) in order to obtain the percentage of pixels selected as comprising edge information in edge map(i−1) or edge image(i−1).

According to an embodiment, the pixels identified as comprising edge information were set to 1 in the edge map(i−1) or edge image(i−1), meaning that the value output from step S230 is the number of pixels selected as comprising edge information in edge map(i−1) or edge image(i−1). Thereafter, in step S240, the number of pixels selected as comprising edge information in edge map(i−1) or edge image(i−1) is divided by the number of pixels (m×n) in the edge map(i−1) or edge image(i−1) in order to obtain the percentage of pixels selected as comprising edge information in edge map(i−1) or edge image(i−1).

In step S250, according to an embodiment, the percentage of pixels selected as comprising edge information in edge map(i−1) or edge image(i−1) is subtracted from the preset desired percentage value β, described above, in order to obtain the error value e(i−1) between the two percentages. According to an alternative embodiment, the preset desired percentage value β is subtracted from the percentage of pixels selected as comprising edge information in edge map(i−1) or edge image(i−1), described above, in order to obtain the error value e(i−1) between the two percentages. The error value e(i−1) is typically a number between 0 and 1, as the percentages are typically numbers between 0 and 1, for example 0.1, 0.2, 0.3 etc.

According to an embodiment, the error value e(i−1) is calculated as:

$$e(i-1) = \frac{\text{sum(row)} + \text{sum}(col)}{2 \times \text{width} \times \text{height}} - (\text{edge percentage}(i-1)) \quad \text{(Eq. 3)}$$

wherein sum(row) and sum(col) are the sums of the values in the data collection, in this case the sum of the values of a vector comprising the sums of the pixel values in each row of the image and each column of the image, respectively, the width and the height are the width and the height of the edge map, in pixels, and the edge percentage(i−1) is the percentage of pixels selected as comprising edge information in edge map(i−1) or edge image(i−1).

As described above, the desired percentage value β is the percentage of pixels in the edge maps that we aim at identifying as comprising edge information. The feedback control loop controls the method, or algorithm, to approach the desired percentage value β in the edge detection. Therefore, according to an embodiment, in step S260 the error value e(i−1) is multiplied by a proportional gain constant K.

In step S270 the resulting value of step S260 is added to the threshold parameter α(i−1) in order to obtain an adjusted threshold parameter α(i). Thereby, the change applied to the threshold for each new frame is proportional to the error value representing the difference between the percentage of pixels selected as comprising edge information in the previous frame and the desired percentage of pixels selected as comprising edge information. The adjusted threshold parameter α(i) is input at step S130b and applied as a threshold on the IR image (i).

According to an embodiment, an adjusted threshold(i) is given by:

$$\alpha(i) = K \times e(i-1) + \alpha(i-1) \quad \text{(Eq. 4)}$$

The proportional gain constant K in the feedback control loop controls the rate at which the threshold value parameter α(i) for the current image (i) is adjusted. As described above, the threshold value parameter α(i) is adjusted by the feedback control loop in order for the percentage of pixels in the subsequent edge map(i) identified as comprising edge information to approach the desired percentage value β.

The proportional gain constant K is set to an appropriate value, taking the following into consideration: A high proportional gain constant K results in a large change in the output for a given change in the error. If the proportional gain constant K is too high, the system can become unstable. In contrast, a small gain results in a small output response to a large input error, and a less responsive or less sensitive controller. If the proportional gain is too low, the control action may be too small when responding to system disturbances.

According to an embodiment, if the resulting threshold parameter α(i) obtains a negative value, the threshold parameter α(i) is set to a small non-negative value, for instance 0.1.

Advantages of Feedback Control

By using a feedback loop to control the threshold parameter α(i) used for the current IR image(i), based on the knowledge about the threshold parameter α(i−1) and the previous IR image(i−1), a continuously improved edge detection is achieved, leading to continuously improved displacement determination and thereby continuously improved image stabilization.

A further effect of the feedback loop control is that the image stabilization method becomes more insensitive to the content of the imaged scene, and the IR radiation information detected by the IR imaging device. In other words, even if the threshold value is not optimal for the first image frame it will be controlled by the feedback loop to be adapted better and better to the following image frames. For instance, a more sensitive IR imaging device, such as an IR imaging device having a cooled detector, would normally require a high threshold value so as not to include too much noise in the edge detection, while a less sensitive IR imaging device, such as an IR imaging device having an uncooled detector, would normally require a low threshold value in order to be able to detect edge information. However, using a feedback control loop according to the embodiments above, the starting of the threshold value may deviate greatly from the optimal threshold value and it will still approach the optimal, or desired, threshold value after a small number of frames.

Figure 7:
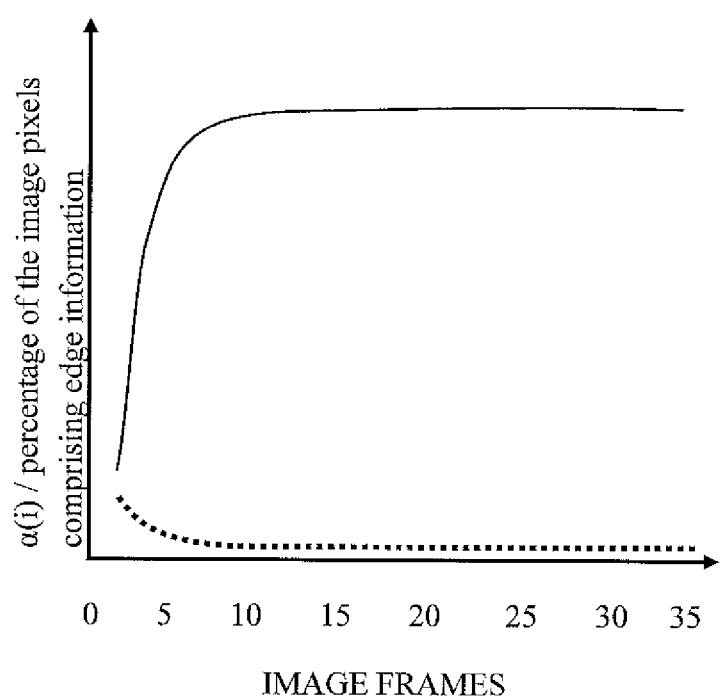
FIG. 7 is a graph showing an example of the threshold parameter adapts over image frames, in accordance with one or more embodiments of the invention.

An example of how the threshold parameter α(i) adapts over 35 image frames is shown in FIG. 7. In FIG. 7, the unbroken line represents the threshold parameter α(i), while the dotted line represents the percentage of the image pixels that are selected as comprising edge information in the thresholding step S130b. In this particular example, the threshold parameter α(i) has a quite low starting value, for instance dependent on the objects of the imaged scene being diffuse, therefore requiring that a large amount of the pixels in the image are identified as edges in the first place in order to find the actual edges in the image. As can be seen in FIG. 7, the threshold value is close to the optimal, or desired, threshold value within 10 frames from applying the feedback control loop.

In other words, the use of a feedback loop renders robustness to the image stabilization method, since the method is not to any significant degree dependent on the content of the imaged scene or the setting of adjustment parameters. Instead, a parameter for the desired edge percentage may be preset, for example during production or calibration of an IR imaging device, according to knowledge of the IR imaging device and/or typical scenes that will be imaged using the IR imaging device. Furthermore, a starting value for the threshold parameter α(i) may be preset, for example during production or calibration of the IR imaging device. It is not important that this value is carefully selected and/or evaluated since the method and system will be regulated and stabilized using the feedback control loop.

As can be seen in FIG. 7, the threshold parameter $\alpha(i)$ has been stabilized after approximately 10 frames. Of course, if the imaged scene changes radically from one frame to the next, a new regulation is needed, taking for instance another 10 frames to stabilize the threshold parameter $\alpha(i)$ and thereby achieving an optimized edge detection, displacement determination and image stabilization, depending in part on the value of the parameter P.

System Architecture

Figure 4:
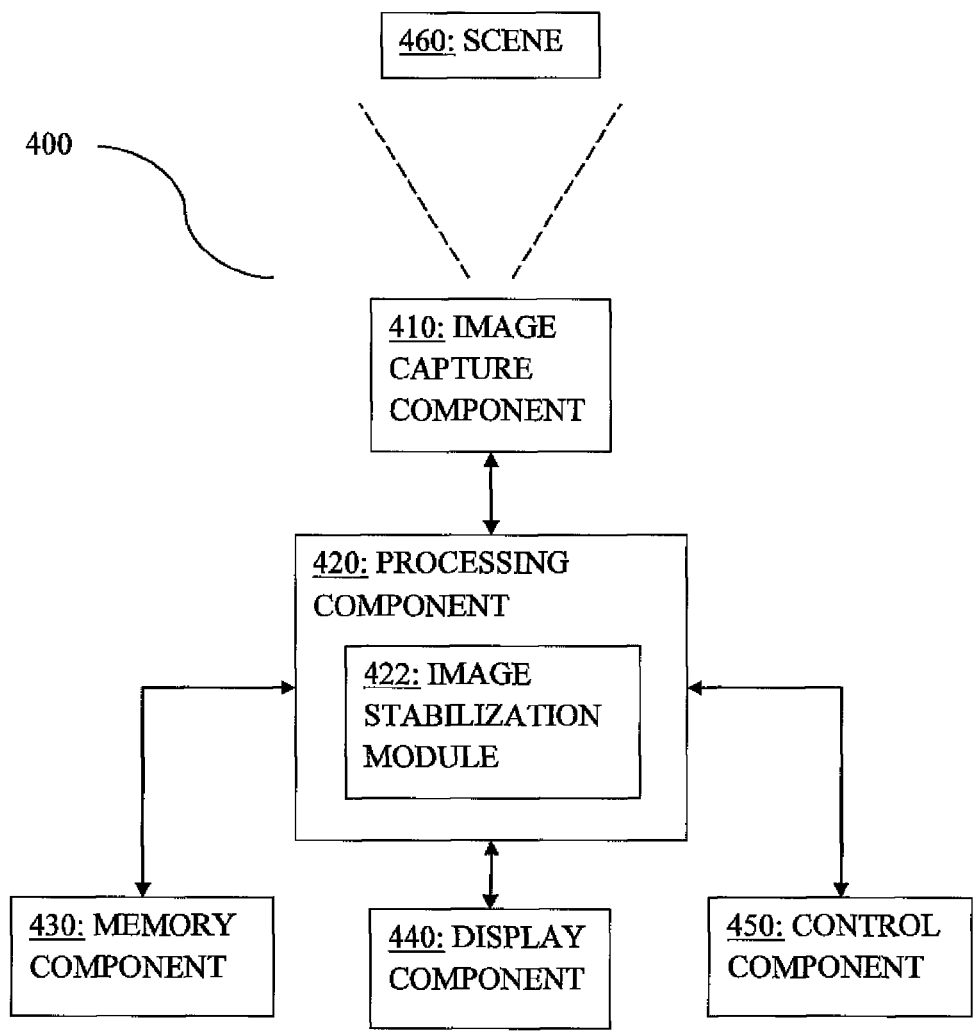
FIG. 4 shows a block diagram of a system for stabilizing IR images captured using an IR imaging device, in accordance with an embodiment of the invention.

FIG. 4 shows a block diagram of a system 400, e.g. an IR imaging system or IR camera, for IR image capturing and processing in accordance with an embodiment. The system 400 comprises, in one implementation, a processing component 420, a memory component 430, an image capture component 410, a control component 450 and a display component 440.

The system 400 may represent an infrared imaging device, such as an infrared camera, to capture and process images, such as consecutive image frames, or video image frames, of a scene 460. The system 400 may represent any type of infrared camera adapted to detect infrared radiation and provide representative data and information (e.g., infrared image data of a scene). For example, the system 400 may represent an infrared camera that is directed to the near, middle, and/or far infrared spectra. In another example, the infrared image data may comprise non-uniform data (e.g., real image data that is not from a shutter or black body) of the scene 460, for processing, as set forth herein. The system 400 may comprise a portable device.

In various embodiments, the processing component 420 comprises a processor, such as one or more of a microprocessor, a single-core processor, a multi-core processor, a microcontroller, a logic device, e.g., a programmable logic device (PLD) configured to perform processing functions, a digital signal processing (DSP) device, etc. According to an embodiment, the processing component 420 is configurable using a hardware description language (HDL). According to an embodiment, the processing component 420 is a Field-programmable gate array (FPGA), i.e. an integrated circuit designed to be configured by the customer or designer after manufacturing and configurable using a hardware description language (HDL). Implementation of some or all of the steps of the image stabilization method, or algorithm, in an FPGA is enabled since the method, or algorithm, comprises no complex or computationally expensive operations.

The processing component 420 may be adapted to interface and communicate with components 410, 430, 440, and 450 to perform method and processing steps and/or operations, as described herein. The processing component 420 may include an image stabilization module 422 adapted to implement an image stabilization method, or algorithm, e.g. an image stabilization algorithm such as discussed in reference to FIGS. 1-2. In one aspect, the processing component 420 may be adapted to perform various other image processing operations including translation/shifting or images, rotation of images and comparison of images or other data collections that may be translated and/or rotated, either as part of or separate from the image stabilization method.

It should be appreciated that image stabilization module 422 may be integrated in software and/or hardware as part of the processing component 420, with code, e.g. software or configuration data, for the image stabilization module 422 stored, e.g., in the memory component 430. Embodiments of the image stabilization method, as disclosed herein, may be stored by a separate computer-readable medium, e.g. a memory, such as a hard drive, a compact disk, a digital video disk, or a flash memory, to be executed by a computer, e.g., a logic or processor-based system, to perform various methods and operations disclosed herein. In one aspect, the computer-readable medium may be portable and/or located separate from the system 400, with the stored image stabilization method, or algorithm, provided to the system 400 by coupling the computer-readable medium to the system 400 and/or by the system 400 downloading, e.g. via a wired link and/or a wireless link, the image stabilization algorithm from the computer-readable medium.

The memory component 430 comprises, in one embodiment, one or more memory devices adapted to store data and information, including infrared data and information. The memory device 430 may comprise one or more various types of memory devices including volatile and non-volatile memory devices, such as RAM (Random Access Memory), ROM (Read-Only Memory), EEPROM (Electrically-Erasable Read-Only Memory), flash memory, etc.

The processing component 420 may be adapted to execute software stored in the memory component 430 so as to perform method and process steps and/or operations described herein.

The image capture component 410 comprises, in one embodiment, one or more infrared sensors, e.g., any type of multi-pixel infrared detector, such as a focal plane array, for capturing infrared image data, e.g. still image data and/or video data, representative of an imaged scene 460. In one implementation, the infrared sensors of the image capture component 410 provide for representing, e.g. converting, the captured image data as digital data, e.g., via an analog-to-digital converter included as part of the infrared sensor or separate from the infrared sensor as part of the system 400.

In one aspect the infrared image data, e.g. infrared video data, may comprise non-uniform data, e.g., real image data, of an image, such as scene 460.

The processing component 420 may be adapted to process the infrared image data, e.g. to provide processed image data, store the infrared image data in the memory component 430, and/or retrieve stored infrared image data from the memory component 430. For example, the processing component 420 may be adapted to process infrared image data stored in the memory component 430 to provide processed image data and information, e.g. captured and/or processed infrared image data.

The control component 45o comprises, in one embodiment, a user input and/or interface device, such as a rotatable knob, e.g. a potentiometer, push buttons, slide bar, keyboard, etc., that is adapted to generate a user input control signal.

The processing component 420 may be adapted to sense control input signals from a user via the control component 450 and respond to any sensed control input signals received therefrom. The processing component 420 may be adapted to interpret such a control input signal as a value, as generally understood by one skilled in the art.

In one embodiment, the control component 45o may comprise a control unit, e.g., a wired or wireless handheld control unit, having push buttons adapted to interface with a user and receive user input control values. In one implementation, the push buttons of the control unit may be used to control various functions of the system 400, such as autofocus, menu enablement and selection, field of view, level, span, noise filtering, high pass filtering, low pass filtering, fusion, temperature measurement functions, and/or various other features as understood by one skilled in the art. In another implementation, one or more of the push buttons may be used to provide input values, e.g. adjustment parameters such as the desired percentage of pixels selected as comprising edge information, characteristics, etc., for an image stabilization algorithm. For example, one or more push buttons may be used to adjust low pass and/or high pass filtering characteristics of, and/or threshold values for edge detection in, infrared images captured and/or processed by the system 400.

The display component 440 comprises, in one embodiment, an image display device, e.g., a liquid crystal display (LCD), or various other types of generally known video displays or monitors. The processing component 420 may be adapted to display image data and information on the display component 440. The processing component 420 may be adapted to retrieve image data and information from the memory component 430 and display any retrieved image data and information on the display component 440.

The display component 440 may comprise display electronics, which may be utilized by the processing component 420 to display image data and information, e.g. infrared images. The display component 440 may be adapted to receive image data and information directly from the image capture component 410 via the processing component 420, or the image data and information may be transferred from the memory component 430 via the processing component 420.

In various embodiments, components of the system 400 may be combined and/or implemented or not, as desired or depending on the application or requirements, with the system 400 representing various functional blocks of a related system. In one example, the processing component 420 may be combined with the memory component 430, the image capture component 410 and/or the display component 440. In another example, the processing component 420 may be combined with the image capture component 410 with only certain functions of the processing component 420 performed by circuitry, e.g., a processor, a microprocessor, a logic device, a microcontroller, etc., within the image capture component 410. Furthermore, various components of the system 400 may be remote from each other, e.g. image capture component 410 may comprise a remote sensor with processing component 420, etc. representing a computer that may or may not be in communication with the image capture component 410.

Applications of Use and Use Cases

Image stabilization according to different embodiments described herein may be used for any application wherein a sequence of consecutive image frames are captured using an imaging device and wherein the imaging device is not kept perfectly still in relation to the imaged scene. Relative movements between the imaging device and the scene cause differences between consecutive frames, thereby requiring shift of the pixels of one image frame in relation to the proceeding frame in order to provide a smooth transition and an impression of stability between the frames in the image frame sequence upon display.

Figure 5:
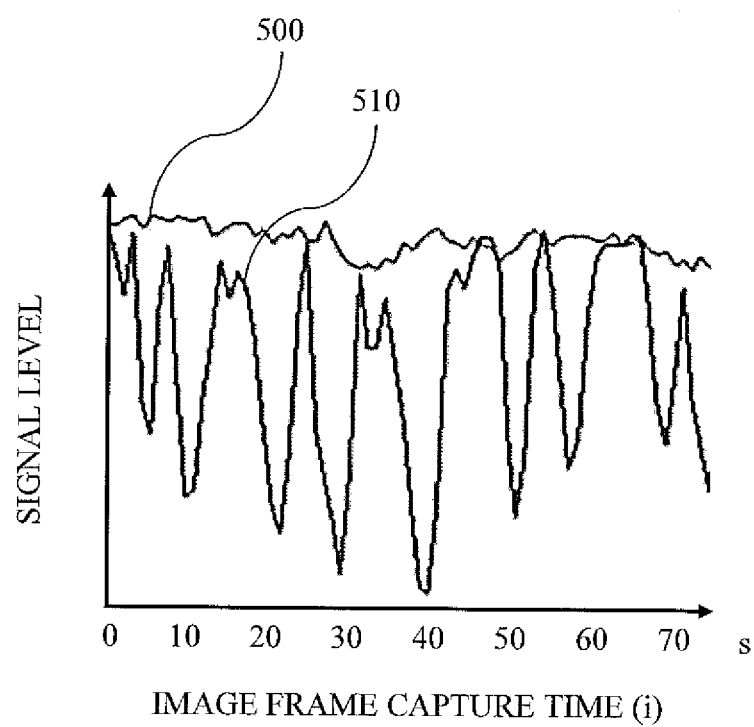
FIG. 5 is a graph showing a comparison of measurement results obtained by an imaging device with and without image stabilization, in accordance with an embodiment of the invention.

A comparison of measurement results obtained by a handheld IR imaging device, with and without IR image stabilization according to an embodiment of the invention is shown in the graph in FIG. 5. The graph in FIG. 5 shows measurement points over time from measuring temperature of a small object, using a handheld IR imaging device. The x-axis shows time, and the y-axis shows signal level, in this case IR radiation, temperature or energy values measured at each measuring time. The curve 500 represents the measurement values after stabilization, while the curve 510 represents the measurement values before use of image stabilization. From FIG. 5 it is clear that the measurement values deviate considerably less when image stabilization is used, as compared to when it is not used, since it is much easier for an operator of the IR imaging device to aim the device when the image is stabilized, and hence the measurements are at a much greater extent performed on the actual object that is being inspected.

One application wherein image stabilization is typically needed is when stitching together two or more image frames in order to create a mosaic, or panoramic, image that is larger than the original image frames. Such a panoramic or mosaic image may consist of image frames that are combined either in one dimension, creating an elongated image, or in two dimensions, width and height.

Another application is when an imaging device is used for inspection of one or more imaged objects, wherein the imaged objects occupy only a small portion of the image frame. The IR imaging device may be handheld, whereby it is hard for a user to keep the IR imaging device still during use. If the imaging device is not kept still in relation to the objects, continuous measurements and/or analysis based on the captured image frames will be hard to perform without image stabilization. For instance, a user may aim an IR imaging device at a power-line in order to investigate the temperature of the power-line and find anomalies in the form of hot spots/temperatures above an allowed temperature range. The JR imaging in this example is handheld and may have a narrow field of view angle, meaning that the user is trying to focus a narrow field of view onto a thin object, typically from a large distance. It is evident that it will be hard for the user to aim perfectly with the handheld camera. The JR radiation information detected by the JR imaging device is transformed into a visual representation of the scene, in the form of a sequence of image frames, that are continuously displayed to the user on a display of the IR imaging device, and/or stored for later display. If no image stabilization is performed, it will be hard for the user to discern what is being shown in the displayed sequence of image frames. However, using image stabilization according to the embodiments presented herein, the user will experience smooth transitions and an impression of stability between the frames in the image frame sequence upon display.

Other applications wherein image stabilization according to embodiments of the invention is advantageously used are for instance in object tracking, gas detection and visualization, video compression and scene based non-uniformity correction (NUC) that removes spatial noise.

As is readily apparent to a person skilled in the art, even though the embodiments described herein are particularly advantageous for stabilization of JR images, they may also be used in relation to images representing other spectra of radiation than the infrared spectrum, for instance visible light radiation, ultraviolet radiation or x-ray radiation.

Rows and Columns

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of stabilizing a sequence of infrared (IR) images captured using an infrared (IR) imaging system, using a processor comprised in said IR imaging system, wherein the processor is adapted to process IR image data, the method comprising:
for each of a first and a second IR image:
i) identifying, by said processor, pixels comprising edge information;
ii) generating, by said processor, an edge map, wherein the pixels identified as comprising edge information are assigned first pixel values that differ from second pixel values for the remaining pixels, and wherein the generating of an edge map further comprises applying one or more threshold values to the first and second IR images, respectively; and
iii) generating, by said processor, a data collection representing the distribution of the first and/or second pixel values in the edge map;
thus resulting in a first data collection representing the distribution of the first and/or second pixel values in the first edge map, and a second data collection representing the distribution of the first and/or second pixel values in the second edge map;
comparing, by said processor, the first data collection to the second data collection;
determining, by said processor, the displacement between said first and second IR images based on the comparison between the first and second data collections;
shifting, by said processor, the second IR image based on the determined displacement, thereby achieving stabilization of the second IR image to the IR first image; and
providing, by said processor, a feedback control loop adapted to optimize said one or more threshold values that are to be applied to the second IR image, in order to obtain an optimized number of, or an optimized amount of, pixels in the second IR image that will be identified as comprising edge information.

2. The method of claim 1, further comprising a selection or:
pre-filtering, by said processor, the first and second IR images in order to extract high frequency content before identifying pixels comprising edge information; and
pre-filtering, by said processor, the first and second selected IR images in order to remove noise from the image.

3. The method of claim 1, wherein
the data collection for each of the first and second IR images comprises the distribution of the first and/or second pixel values in the first image along an x-axis of the image and a y-axis of the image, respectively.

4. The method of claim 1, wherein the data collections for each of the first and second IR images are generated by applying Radon transformations to the edge information representations.

5. The method of claim 1, wherein comparing the first data collection to the second data collection comprises at least two comparisons, wherein, for each of the at least two sequent comparisons, the second data collection is shifted, by said processor, in relation to the first data collection or the first data collection is shifted in relation to the second data collection.

6. The method of claim 1, wherein said one or more threshold values are controlled, by said processor, such that the percentage of pixels in the second IR image that are identified as comprising edge information approaches a preset desired percentage value $\beta$.

7. The method of claim 1, wherein said one or more threshold values are controlled, by said processor, based on the one or more threshold parameters applied on the first IR image and the percentage of pixels identified as comprising edge information in the first IR image.

8. An infrared (IR) imaging system, comprising:
an infrared sensor;
a processor adapted to process infrared image data from the infrared sensor depicting a scene, the processor being further adapted to:
receive a sequence of infrared (IR) images captured using an infrared (IR) imaging device;
for each of a first and a second IR image:
i) identify pixels comprising edge information;
ii) generate an edge map, wherein the pixels identified as comprising edge information are assigned first pixel values that differ from second pixel values for the remaining pixels, and wherein the generating of an edge map further comprises applying one or more threshold values to the first and second IR images, respectively; and
iii) generate a data collection representing the distribution of the first and/or second pixel values in the edge map;
thus resulting in a first data collection representing the distribution of the first and/or second pixel values in the first edge map, and a second data collection representing the distribution of the first and/or second pixel values in the second edge map;
compare the first data collection to the second data collection;
determine the displacement between said first and second IR images based on the comparison between the first and second data collections;
shift the second IR image based on the determined displacement, thereby achieving stabilization of the second IR image to the first IR image; and
provide a feedback control loop adapted to optimize said one or more threshold values that are to be applied to the second IR image, in order to obtain an optimized number of, or an optimized amount of, pixels in the second IR image that will be identified as comprising edge information.

9. The infrared (IR) imaging system of claim 8, further comprising a selection of:
a display component adapted to display the second IR image stabilized to the first IR image;
a memory component adapted to store image data the second IR image stabilized to the first IR image; and
an output component adapted to output the second IR image stabilized to the first IR image to a receiving unit.

10. The infrared (IR) imaging system of claim 8, wherein the processor is configurable using a hardware description language (HDL).

11. The infrared (IR) imaging system of claim 8, wherein the processor is a Field-programmable gate array (FPGA).

12. The infrared (IR) imaging system of claim 8, the processor further being adapted to:
pre-filter the first and second IR images in order to extract high frequency content before identifying pixels comprising edge information; or
pre-filter the first and second IR images in order to remove noise from the image.

13. A computer system having a processor being adapted to perform the steps or functions of claim 1.

14. A non-transitory computer-readable medium on which is stored information adapted to control a processor to perform the steps or functions of claim 1.

15. A computer program product stored on a non-transitory computer-readable medium comprising code portions adapted to control a processor to perform the steps or functions of claim 1.

16. A computer program product stored on a non-transitory computer-readable medium comprising configuration data adapted to configure a Field-Programmable Gate Array (FPGA) to ton perform the steps or functions of claim 1.

17. The method of claim 1, wherein:
   said comparing the first data collection to the second data collection comprises
   performing at least two comparisons between said first and second data collections, thereby generating a set of at least two differences; and
   said determining the displacement between said first and second IR images comprises determining the displacement by identifying the minimum difference from the generated set of at least two differences.

* * * * *